A. R. WIGGS.
Cotton Planter.
No. 89,958.
Patented May 11, 1869.
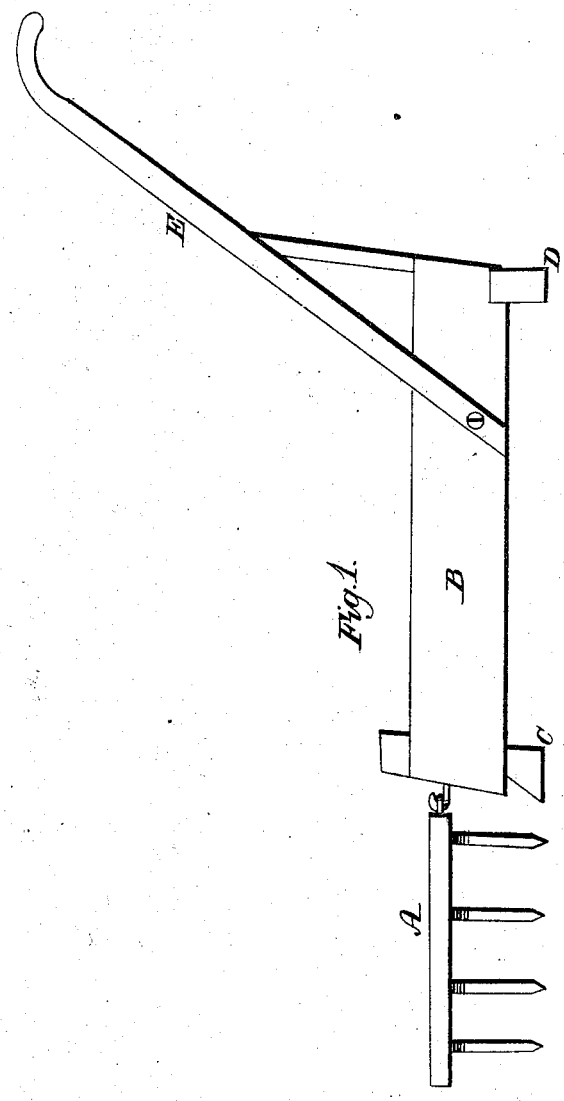
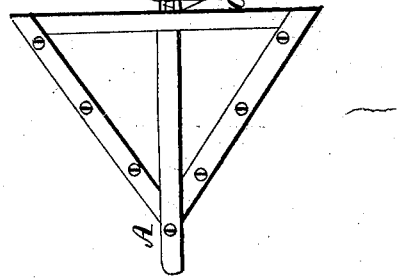
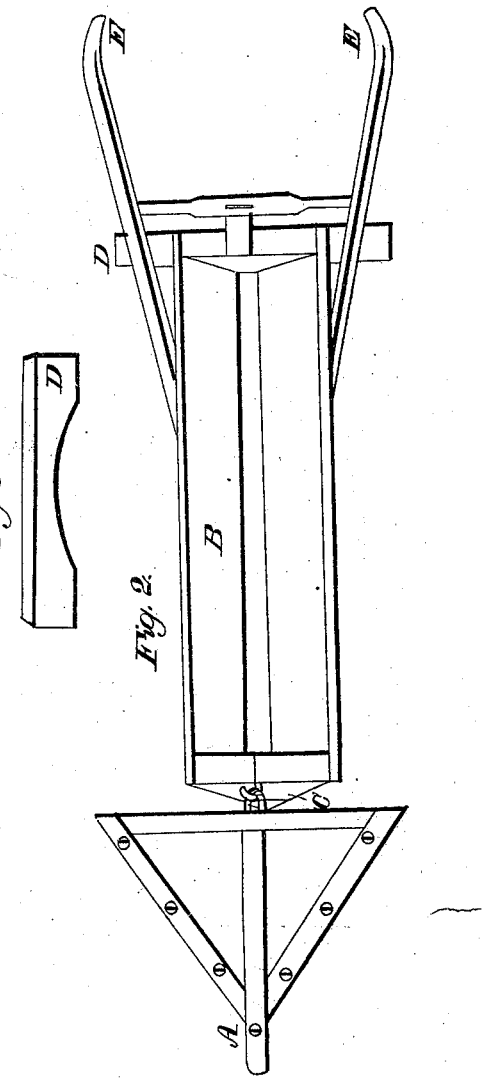

United States Patent Office.

ALEXANDER R. WIGGS, OF IUKA, MISSISSIPPI.

Letters Patent No. 89,958, dated May 11, 1869.

IMPROVEMENT IN COTTON-PLANTERS.

The Schedule referred to in these Letters Patent and making part of the same.

*To all whom it may concern:*

Be it known that I, ALEXANDER R. WIGGS, of Iuka, county of Tishemingo, State of Mississippi, have invented an Improvement in Cotton-Planters, being a harrow, plow, hopper, and scraper, combined; and I do hereby declare the following to be an exact description thereof, reference being had to the accompanying drawings, and to the letters of reference marked thereon, making a part of this specification.

Figure 1 represents a side view of the cotton-planter.
Figure 2, a top view of the same.
Figure 3, a front view of the coverer.

The nature of my invention consists in the arrangement of the harrow, plow, hopper, scraper, or coverer and handles, as constructed and combined, for the purpose of planting cotton in the easiest and most expeditious manner.

To enable others skilled in the art to make and use my invention, I will proceed to describe its construction and operation.

A represents the triangular harrow in front, to which the horse is attached, the harrow being fastened, by a hook or chain, to the seeding-hopper B, that is an oblong receptacle for the cotton-seed, and is angular-shaped, wider at top than at the bottom, and the bottom being open to allow the cotton to fall through into the furrow beneath, made by the plow, or opener C, that is permanently attached to the bottom of the hopper, at the front end.

At the rear end of the hopper, and across the bottom, at right angles, the scraper D is permanently fastened, the lower side of the scraper being arched, so as to cover, or scrape the earth in a ridge over the furrow containing the seed that has been dropped in through the hopper by the hand of the operator, who supplies the hopper with the seed whilst the machine is in motion.

The handles E, attached to the rear side of the hopper, enable the driver to guide and regulate the movement of the machine.

The advantages of my machine save the use of a horse and man with a harrow; also a horse and man with an opener and seeder; also a horse and man with a coverer, as heretofore used, one man and horse, with my machine, doing the work of three.

What I claim as my invention, and desire to secure by Letters Patent, is—

The arrangement and combination of the harrow A, plow C, hopper B, scraper D, and handles E, when constructed and operating as herein described, and for the purposes set forth.

Witnesses: ALEX. R. WIGGS.
J. FRANKLIN REIGART,
EDM. F. BROWN.